United States Patent
Ha (10) Patent No.: US 12,391,234 B2
(45) Date of Patent: Aug. 19, 2025

(54) DEVICE FOR CONTROLLING HYBRID VEHICLE AND METHOD THEREOF

(71) Applicants: HYUNDAI MOTOR COMPANY, Seoul (KR); Kia Corporation, Seoul (KR)

(72) Inventor: Seung Woo Ha, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 360 days.

(21) Appl. No.: 17/851,532

(22) Filed: Jun. 28, 2022

(65) Prior Publication Data
US 2023/0234554 A1 Jul. 27, 2023

(30) Foreign Application Priority Data
Jan. 10, 2022 (KR) .................. 10-2022-0003395

(51) Int. Cl.
| | |
|---|---|
| *B60L 9/00* | (2019.01) |
| *B60W 10/06* | (2006.01) |
| *B60W 10/08* | (2006.01) |
| *B60W 10/26* | (2006.01) |
| *B60W 20/13* | (2016.01) |

(52) U.S. Cl.
CPC ............ *B60W 20/13* (2016.01); *B60W 10/06* (2013.01); *B60W 10/08* (2013.01); *B60W 10/26* (2013.01); *B60W 2540/30* (2013.01); *B60W 2710/244* (2013.01); *B60W 2756/10* (2020.02)

(58) Field of Classification Search
CPC ...... B60W 20/13; B60W 10/06; B60W 10/08; B60W 10/26; B60W 2756/10; B60W 2540/30; B60W 2710/244
See application file for complete search history.

(56) References Cited

U.S. PATENT DOCUMENTS

| | | |
|---|---|---|
| 2006/0282197 A1 | 12/2006 | Schoggl |
| 2009/0099723 A1 | 4/2009 | Schoggl |
| 2014/0163807 A1 | 6/2014 | Schoggl |
| 2016/0025025 A1 | 1/2016 | Schoggl |
| 2019/0367040 A1 | 12/2019 | Kameda et al. |
| 2021/0063197 A1 | 3/2021 | Nagano et al. |
| 2021/0139014 A1* | 5/2021 | Zhao .................. B60W 30/188 |
| 2022/0242390 A1* | 8/2022 | Li ......................... B60W 10/06 |

FOREIGN PATENT DOCUMENTS

| | | |
|---|---|---|
| JP | 2006-526104 A | 11/2006 |
| JP | 2012-168037 A | 9/2012 |
| JP | 2014-232497 A | 12/2014 |
| JP | 6886211 B2 | 6/2021 |
| KR | 10-0461273 B1 | 12/2004 |
| KR | 10-1952037 B1 | 2/2019 |
| KR | 10-2031921 B1 | 10/2019 |
| KR | 10-2020-0129803 A | 11/2020 |

* cited by examiner

*Primary Examiner* — Adam M Alharbi
(74) *Attorney, Agent, or Firm* — MORGAN, LEWIS & BOCKIUS LLP (57) ABSTRACT

A device and method for controlling a hybrid vehicle. The device includes a connection device that provides a connection interface with a hybrid vehicle network, and a controller that collects driving data through the connector, determines a driving state based on the driving data, generates a driving pattern according to a transition of the driving state, and controls driving of the hybrid vehicle based on an output ratio of a first power source to a second power source corresponding to the driving pattern.

12 Claims, 10 Drawing Sheets

| OFFICIAL FUEL ECONOMY MODE | TIME (sec) | CONVERSION BASED ON 10 MINUTES | | |
|---|---|---|---|---|
| | | DRIVING ENERGY (kJ) | REGENERATIVE ENERGY (kJ) | TOTAL REQUIRED ENERGY (kJ) |
| FTP | 1400 | 2051 | 994 | 1057 |
| HWY | 775 | 4936 | 517 | 4419 |
| SC03 | 601 | 2675 | 1455 | 1220 |
| US06 | 600 | 8848 | 2655 | 6193 |
| JC08 | 1204 | 1565 | 775 | 790 |
| NEDC | 1180 | 2229 | 719 | 1510 |
| WLTP | 1800 | 3696 | 1075 | 2621 |

DEVICE FOR CONTROLLING HYBRID VEHICLE AND METHOD THEREOF

CROSS-REFERENCE TO RELATED APPLICATION

This application claims the benefit of priority to Korean Patent Application No. 10-2022-0003395, filed on Jan. 10, 2022 in the Korean Intellectual Property Office, the entire contents of which are incorporated herein by reference.

TECHNICAL FIELD

The present disclosure relates to a technology for adjusting an output ratio (e.g., a ratio of engine output to motor output) of a hybrid vehicle based on big data.

BACKGROUND

A hybrid electric vehicle is a vehicle in which the functions of a petroleum fueled vehicle and an electric vehicle are combined in order to solve problems such as exhaust gas problems in petroleum fueled vehicles that use only gasoline, diesel or gas, and shortening of battery usage time in electric vehicles that use only batteries.

Recently, the demand for an eco-friendly vehicle has increased in accordance with the demand for improvement of automobile fuel efficiency and the strengthening of emission regulations in each country, and a hybrid electric vehicle has attracted attention as a realistic alternative.

The hybrid electric vehicle includes a series hybrid electric vehicle (SHEV), a parallel hybrid electric vehicle (PHEV), and the like.

The parallel hybrid electric vehicle includes an engine that uses fossil fuels and a motor that assists engine output and uses electricity as power. The output of the motor may be adjusted according to a control value such as the strength of a supply voltage determined by the motor controller according to the driving (traveling) condition of the vehicle, and the power output by the motor is transmitted to the engine output shaft, thereby assisting the power output from the engine.

The output shaft of the motor is directly connected to the output shaft of the engine, specifically, one end of the crankshaft or is connected to transmit power through a belt or chain to assist the engine output, and the crankshaft output end opposite to the motor is provided to allow a transmission to intermittently receive power from the engine through a clutch, which shifts the engine power according to the driving situation and power and transmits it to the driving wheels.

Such a parallel hybrid electric vehicle may produce a high output while reducing the displacement volume of engine, and may significantly reduce harmful exhaust gas. In addition, the simple structure makes it easy to design and does not cost much, which is advantageous in securing price competitiveness. Meanwhile, it is complicated in terms of control because the ratio of engine output and motor output must be adjusted according to the driving situation.

A strategy in which a hybrid control unit (HCU) that controls a parallel hybrid electric vehicle determines the ratio of engine output and motor output is one of the most core and essential control strategies directly related to fuel efficiency. For reference, such a hybrid control unit must satisfy following Equation 1 in determining the ratio of engine output and motor output.

$$P_R = P_{EG} + P_B \quad \text{[Equation 1]}$$

Where $P_{EG}$ is the engine torque, $P_B$ is the motor torque, and $P_R$ is the required torque, respectively. For example, when the requested torque $P_R$ set by the accelerator pedal operation of a driver is '3' and the engine torque $P_{EG}$ determined according to the driving situation is '2', the motor torque $P_B$ is '1'.

In general, the hybrid controller determines the ratio of engine output to motor output based on an equivalent consumption minimization strategy (ECMS). That is, the hybrid controller simply determines the ratio of engine output to motor output so that the state of charge (SOC) of the battery maintains a reference SOC (e.g., 60%) without considering the driving pattern of the vehicle.

Therefore, the conventional hybrid controller cannot determine the ratio (optimal ratio) of engine output to motor output capable of minimizing the electrical energy consumption of the battery and fuel consumption in a rapidly changing driving environment.

The matters described in this background section are intended to promote an understanding of the background of the disclosure and may include matters that are not already known to those of ordinary skill in the art.

SUMMARY

The present disclosure has been made to solve the above-mentioned problems occurring in the prior art while advantages achieved by the prior art are maintained intact.

An aspect of the present disclosure provides a device and method for controlling a hybrid vehicle that can minimize electric energy consumption of a battery and fuel consumption in a rapidly changing driving environment by collecting driving data from a plurality of vehicles, determining a driving state based on the driving data, generating a driving pattern according to the transition probability of the driving state, and controlling the driving of the hybrid vehicle based on the output ratio of a first power source to a second power source (e.g., engine output and motor output) corresponding to the driving pattern.

The technical objects of the present disclosure are not limited to the above-mentioned one, and the other unmentioned technical objects and advantages will become apparent from the following description. Also, it may be easily understood that the objects and advantages of the present disclosure may be realized by the units and combinations thereof recited in the claims.

According to an aspect of the present disclosure, a device for controlling a hybrid vehicle includes a connection device that provides a connection interface with a hybrid vehicle network, and a controller that collects driving data through the connection device, determines a driving state based on the driving data, generates a driving pattern according to a transition of the driving state, and controls driving of the hybrid vehicle based on an output ratio of a first power source to a second power corresponding to the driving pattern.

The device may further include a storage that stores a table in which ratios of output of the first power source to output of the second power source for a plurality of driving patterns are recorded, in which the output of the first power source includes engine output and the output of the second power source includes motor output.

The controller may search the table for a ratio of engine output to motor output corresponding to the generated driving pattern, among the ratios of engine output to motor output for the plurality of driving patterns.

The controller may collect the driving data from a plurality of vehicles traveling on a road, determine the driving state based on the driving data, generate a plurality of driving patterns according to a transition probability of the driving state, and determine the ratios of engine output to motor output corresponding to the plurality of driving patterns.

The controller may collect speeds, gradients of the road and brake hydraulic pressures from the plurality of vehicles.

The controller may determine the driving state based on the collected speeds, gradients and brake hydraulic pressures, generate a transition probability matrix of the driving state, and generate the plurality of driving patterns based on the transition probability matrix.

The controller may detect a representative speed of a speed section including the collected speeds, detect a representative gradient of a gradient section including the collected gradients, detect a representative hydraulic pressure of a hydraulic pressure section including the collected brake hydraulic pressures, assign different code numbers for each combination of the representative speed, the representative gradient and the representative hydraulic pressure, generate a transition number matrix indicating a number of times for which a first code number at a current time point (t) transitions to a second code number at a next time point (t+1), generate a transition probability matrix by normalizing the transition number matrix, and generate the plurality of driving patterns based on the transition probability matrix.

The controller may determine the ratios of engine output to motor output corresponding to the plurality of driving patterns through a simulation tool.

According to another aspect of the present disclosure, a method of controlling a hybrid vehicle includes collecting, by a driving data from a hybrid vehicle network, controller, determining, by the controller, a driving state based on the driving data, generating, by the controller, a driving pattern according to a transition of the driving state, and controlling, by the controller, driving of the hybrid vehicle based on an power output ratio of a first source to a second power corresponding to the driving pattern.

The method may further include storing, by storage, a table in which ratios of output of the first power source to output of the second power source for a plurality of driving patterns are recorded, in which the output of the first power source includes engine output and the output of the second power source includes motor output.

The controlling of the driving may include searching the table for a ratio of engine output to motor output corresponding to the generated driving pattern, among the ratios of engine output to motor output for the plurality of driving patterns.

The storing of the table may include collecting, by the controller, the driving data from a plurality of vehicles traveling on a road, determining, by the controller, the driving state based on the driving data to generate a plurality of driving patterns according to a transition probability of the driving state, and determining the ratios of engine output and motor output corresponding to the plurality of driving patterns.

The collecting of the driving data may include collecting speeds, gradients of the road and brake hydraulic pressures from the plurality of vehicles.

The generating of the plurality of driving patterns may include determining the driving state based on the collected speeds, gradients and brake hydraulic pressures, generating a transition probability matrix of the driving state, and generating the plurality of driving patterns based on the transition probability matrix.

The generating of the plurality of driving patterns may include detecting a representative speed of a speed section including the collected speeds, detecting a representative gradient of a gradient section including the collected gradients, detecting a representative hydraulic pressure of a hydraulic pressure section including the collected brake hydraulic pressures, assigning different code numbers for each combination of the representative speed, the representative gradient and the representative hydraulic pressure, generating a transition number matrix indicating a number of times for which a first code number at a current time point (t) transitions to a second code number at a next time point (t+1), generating a transition probability matrix b normalizing the transition number matrix, and generating the plurality of driving patterns based on the transition probability matrix.

The determining of the ratio of engine output to motor output may include determining the ratios of engine output to motor output corresponding to the plurality of driving patterns through a simulation tool.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
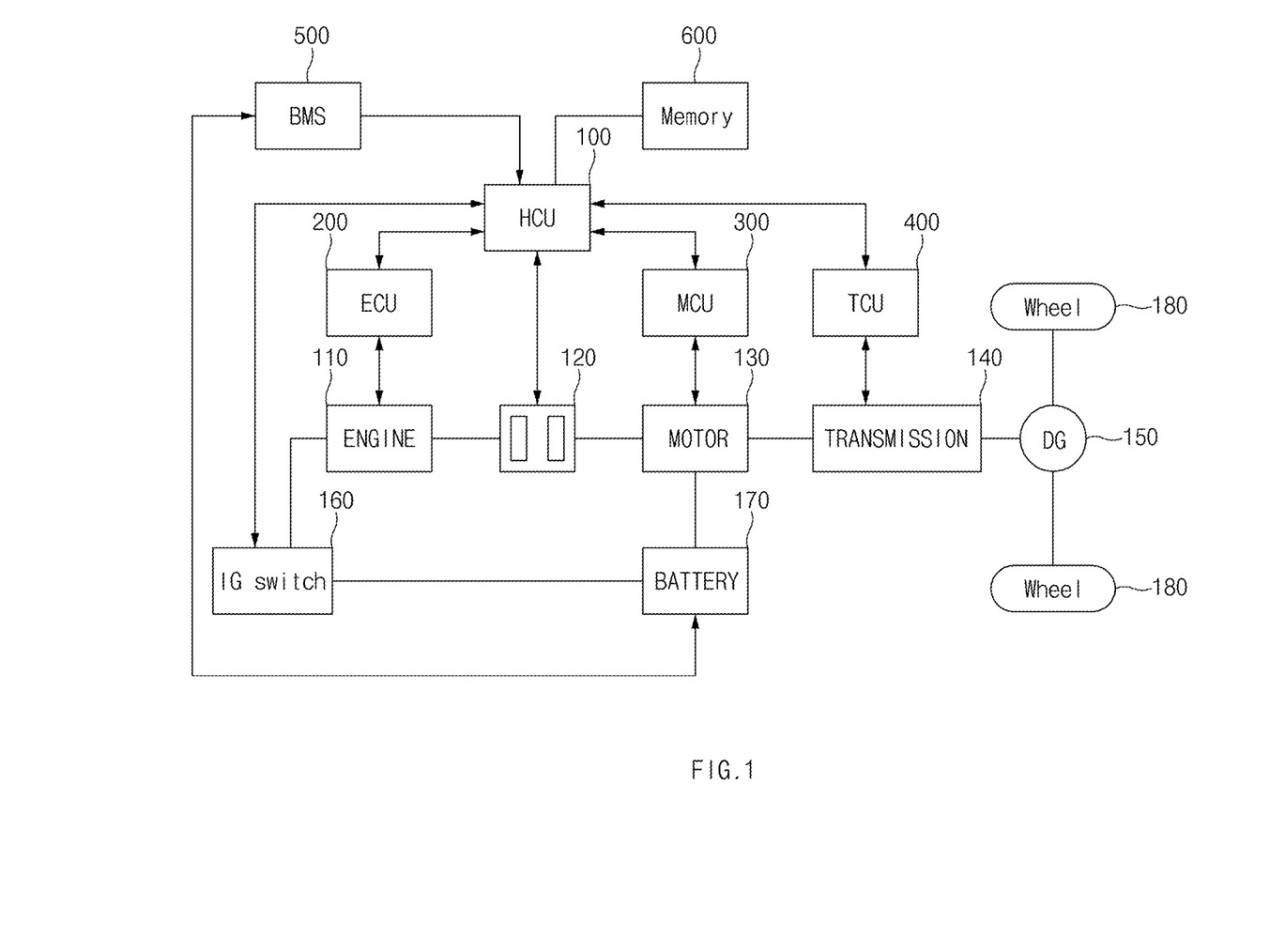
FIG. 1 is a block diagram illustrating an example of a hybrid vehicle to which an exemplary embodiment of the present disclosure is applied.

FIG. 1 is a block diagram illustrating an example of a hybrid vehicle to which an exemplary embodiment of the present disclosure is applied.

As shown in FIG. 1, a hybrid vehicle to which an embodiment of the present disclosure is applied may include an engine 110, an engine clutch 120, a motor 130, a transmission 140, a differential gear 150, an ignition switch 160, a battery 170, and a wheel 180.

Examining each component, first, the engine clutch 120 controls power between the engine 110 and the motor 130, and the ignition switch 160 starts the engine 110 or the motor 130 through the battery 170 connected to the motor 130. The battery 170 supplies voltage to the motor 130 in an EV driving mode.

In addition, the hybrid vehicle may include a hybrid control unit (HCU) 100, a non-volatile memory 600 connected to the HCU 100, an engine control unit (ECU) 200, a motor control unit (MCU) 300, a transmission control unit (TCU) 400, and a BMS 500.

The ECU 200 may control the overall operation of the engine 110. The MCU 300 may control the overall operation of the motor 130. The TCU 400 may control the overall operation of the transmission 140. That is, the ECU 200 controls the operation of the engine 110 according to a control signal applied from the HCU 100 through a network.

The MCU 300 converts the DC voltage of the battery 170 to a three-phase AC voltage according to a control signal provided to the network from the HCU 100 to control the output torque and speed of the motor 130 according to the required output. In addition, the MCU 300 cranks the engine through the motor 130 to execute the engine start-on under the control of the HCU 100.

In addition, the MCU 300 may include an inverter including a plurality of power switching devices, and the power switching device may include one of an insulated gate bipolar transistor (IGBT), a MOSFET, and a transistor.

The BMS 500 manages the state of charge (SOC) by detecting the current, voltage, temperature, and the like of each cell within an operating range of the battery 170, and provides all information about the battery 170 through the network to control the charge/discharge voltage of the battery 170, such that it is possible to prevent the battery 170 from being over-discharged below a limit voltage or over-charged above the limit voltage to shorten the lifespan.

The HCU 100, which is a high-level controller that controls the overall operation of the hybrid vehicle, may be connected to various controllers through a network to exchange information with each other. The HCU 100 may execute cooperative control to control the output torques of the engine 110 and the motor 130 and maintain driving by controlling the target gear ratio. In this case, the non-volatile memory 600, which is a memory device capable of erasing and re-inputting data while preserving the stored data even when the power is cut off, may be installed inside or outside the HCU 100. The non-volatile memory 600 may include a flash memory, an electrically erasable and programmable read only memory (EEPROM), and the like. In addition, the HCU 100 may calculate an engine speed (RPM), an engine torque, an ignition angle, and the like to give a command to the ECU 200.

In particular, when an embodiment of the present disclosure is applied, the HCU 100 may minimize electrical energy consumption of the battery 170 and fuel consumption in a rapidly changing driving environment by collecting driving data from a plurality of vehicles traveling on a road, determining a driving state based on the driving data, generating a driving pattern based on to the transition probability of the driving state, and controlling the driving of the hybrid vehicle based on the ratio of engine output and motor output corresponding to the driving pattern.

Figure 2:
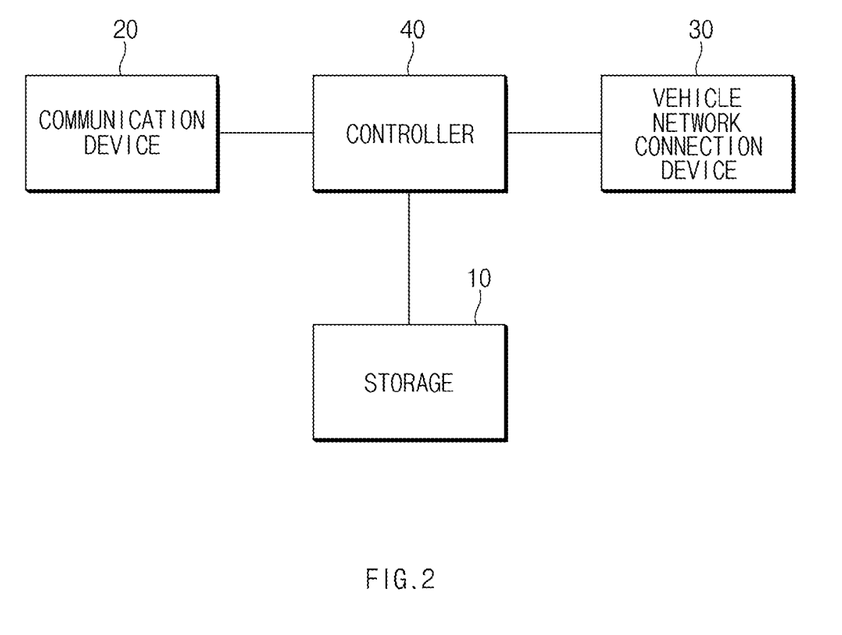
FIG. 2 is a block diagram of a device for controlling a hybrid vehicle according to an exemplary embodiment of the present disclosure.

FIG. 2 is a block diagram of a device for controlling a hybrid vehicle according to an exemplary embodiment of the present disclosure. Although an embodiment implemented as a separate configuration from the HCU 100 will be described, it may be implemented by being integrated into the HCU 100 as another embodiment. That is, the function of the control device according to an embodiment of the present disclosure may be implemented such that the HCU 100 performs the function. In particular, the functions of collecting driving data from a plurality of vehicles traveling on a road, determining a driving state based on the driving data, generating a driving pattern based on to the transition probability of the driving state, and controlling the driving of the hybrid vehicle based on the ratio of engine output to motor output corresponding to the driving pattern through a simulation tool may be implemented to be performed by a server. In this case, the server may include a server that processes vehicle customer relation management (VCRM) data.

As shown in FIG. 2, a device for controlling a hybrid vehicle according to an embodiment of the present disclosure may include storage 10, a communication device 20, a vehicle network connection device 30, and a controller 40. In this case, according to a scheme of implementing a device for controlling a hybrid vehicle according to an embodiment of the present disclosure, components may be implemented as one while being combined with each other, or some components may be omitted.

Regarding each component, the storage 10 may store various logic, algorithms and programs required in the processes of collecting driving data from a plurality of vehicles traveling on a road, determining a driving state based on the driving data, generating a driving pattern based on to the transition probability of the driving state, and controlling the driving of the hybrid vehicle based on the ratio between power sources corresponding to the driving pattern. In this case, the power source, which is a module for providing energy for driving a vehicle, will be described with the engine and motor outputs as examples, but the embodiment is not limited thereto.

The storage 10 may store a table in which the ratio of engine output to motor output corresponding to each driving pattern is recorded.

The storage 10 may store various logic, algorithms and programs required in the processes of collecting driving data of a hybrid vehicle, determining a driving state based on the driving data, generating a driving pattern based on the transition of the driving state, and controlling the driving of the hybrid vehicle based on the ratio of engine output to motor output corresponding to the driving pattern.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The communication device 20, which is a module that provides a communication interface with a plurality of vehicles traveling on a road, may include at least one of a mobile communication module, a wireless Internet module, and a short-range communication module.

The mobile communication module may communicate with a vehicle through a mobile communication network constructed according to a technical standard or communication scheme for mobile communication global (e.g., system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), and the like).

The wireless Internet module, which is a module for wireless Internet access, may communicate with a vehicle through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The short-range communication module may support short-range communication by using at least one of Bluetooth™, radio frequency identification (RFID), infrared data association (IrDA), ultra wideband (UWB), ZigBee, near field communication (NFC), and wireless USB technology.

The vehicle network connection device 30, which is a module that provides a connection interface with a vehicle network, may include a controller area network (CAN), a controller area network with flexible data-rate (CAN FD), a local interconnect network (LIN), FlexRay, a media oriented systems transport (MOST), Ethernet, and the like.

The controller 40 may perform the overall control such that each component performs its function. The controller 40 may be implemented in the form of hardware or software, or may be implemented in a combination of hardware and software. Preferably, the controller 40 may be implemented as a microprocessor, but is not limited thereto.

In particular, the controller 40 may collect the driving data from the network provided in the hybrid vehicle, and determine the driving state based on the driving data. In addition, the controller 40 may generate the driving pattern according to the transition of the driving state, and control the driving of the hybrid vehicle based on the ratio of engine output to motor output corresponding to the driving pattern. In this case, the driving data, which is data affecting the fuel efficiency of the hybrid vehicle, may include vehicle speed, gradient, brake hydraulic pressure, acceleration, deceleration, road altitude, vehicle weight, and the like. In an embodiment of the present disclosure, the vehicle speed, the gradient, and the brake hydraulic pressure, which have the greatest influence on fuel efficiency, will be described as examples.

For reference, the vehicle speed is an index indicating the output of the vehicle, and in general, the faster the vehicle speed, the greater the vehicle output (vehicle energy consumption). However, even at the same vehicle speed, the output of the vehicle is different according to the inclination. That is, when the vehicle speed is 10 kph, the energy to be output by the vehicle on an uphill road is different from the energy to be output by the vehicle on a downhill road. In addition, when the speed of the vehicle is reduced on the uphill road, brake hydraulic pressure information is required to determine whether the vehicle speed is decreased on the uphill road or decelerated due to the brake hydraulic pressure. As a result, the total energy to be output by the vehicle is determined according to the driving state of the vehicle, and the determined total energy must be appropriately distributed to each power source of the vehicle (e.g., engine output and motor output) so that the vehicle has the best fuel efficiency. In this case, it is preferable that vehicle speed information, gradient information, and brake hydraulic pressure information are typically used as indicators indicating the driving state.

Hereinafter, the operation of the controller 40 will be described in detail with reference to FIG. 3.

Figure 3:
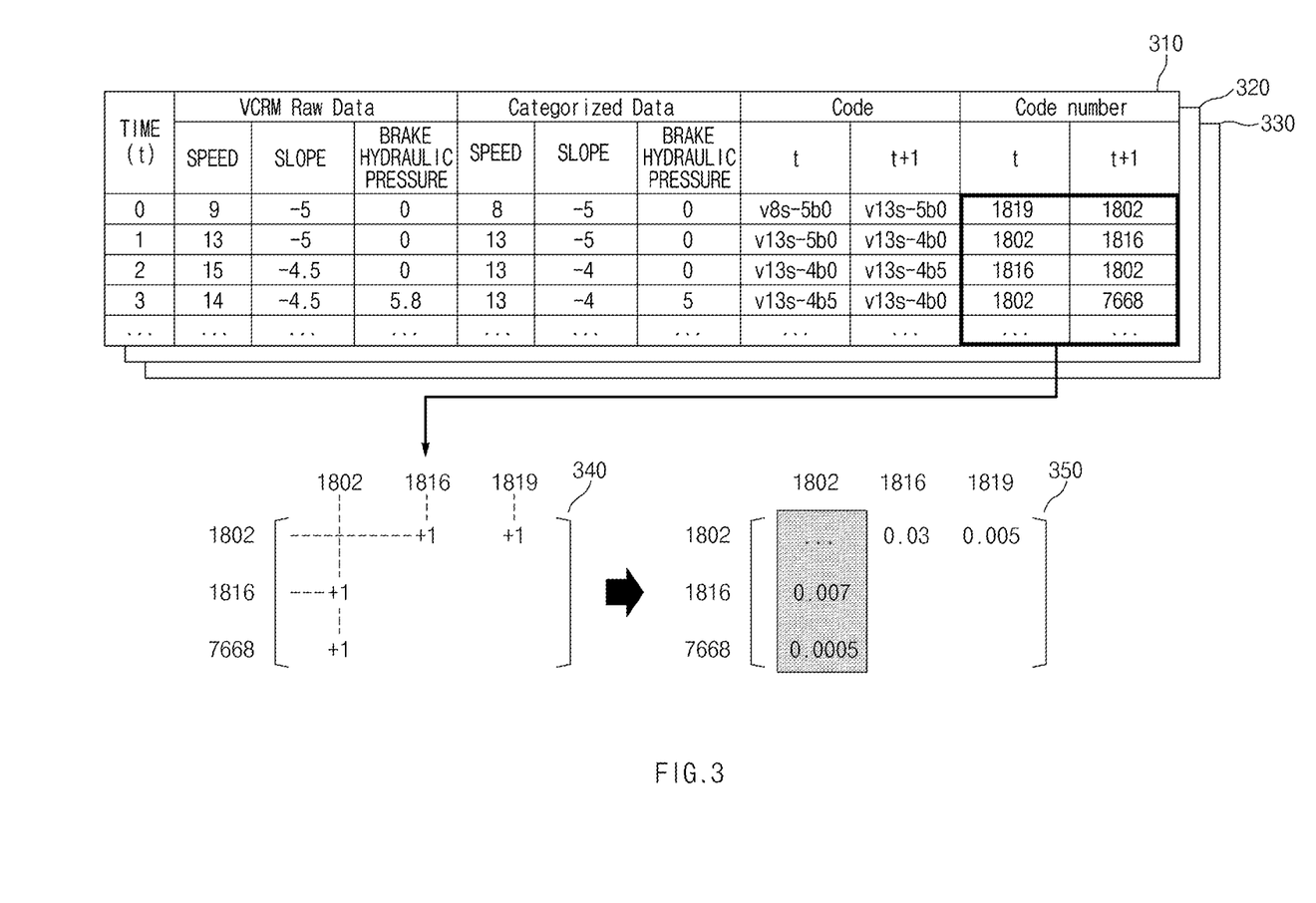
FIG. 3 is a view illustrating an example of a process of generating a plurality of driving patterns by a controller provided in a device for controlling a hybrid vehicle according to an exemplary embodiment of the present disclosure.

FIG. 3 is an exemplary diagram illustrating a process of generating a plurality of driving patterns by a controller provided in a device for controlling a hybrid vehicle according to an exemplary embodiment of the present disclosure.

In FIG. 3, reference numeral 310 indicates a state in which a code number is assigned to driving data collected from a first vehicle, and reference numeral 320 indicates a state in which a code number is assigned to driving data collected from a second vehicle. Reference numeral 330 indicates a state in which a code number is assigned to driving data collected from a third vehicle. In this case, the driving data may be continuously collected from the starting point of each vehicle to a time point when the vehicle is turned off.

The controller 40 may collect the speed, gradient and brake hydraulic pressure as driving data from the first vehicle. For example, at time '0', the speed collected is 9 kph, the slope is −5 degrees, the brake hydraulic pressure is '0', at time '1', the speed collected is 13 kph, the slope is −5 degrees, and the brake hydraulic pressure is '0'. At time '2', the speed collected is 15 kph, the slope is −4.5 degrees, the brake hydraulic pressure is '0', and at time '3', the speed collected is 14 kph, the slope is −4.5 degrees, and the brake hydraulic pressure is 5.8.

The speed, inclination, and brake hydraulic pressure collected in this manner are continuous values. When each value is defined as a factor determining the driving state of the vehicle, the number representing the driving state of the vehicle exceeds the processing limit. Therefore, by dividing the speed, the gradient, and the brake hydraulic pressure into specified sections and defining the representative values of each section as factors determining the driving state of the vehicle, the driving state of the vehicle may be limited to an optimal number. In this case, it is preferable to determine the minimum and maximum values for the speed, inclination and brake hydraulic pressure, and to determine the specified section at a level at which the distribution characteristic before segmentation is maintained. For example, the speed may be divided into 130 sections, the gradient may be divided into 20 sections, and the brake hydraulic pressure may be divided into 30 sections.

As shown in FIG. 3, the representative value of the section including speed '9' is '8', and the representative value of the section including speeds 13, 14 and 15 is '13'. The representative value for the section including slope '−5' is −5, the representative value for the section including slope '−4.5' is '−4', and the representative value for the section including brake hydraulic pressure '5.8' is '5'.

The controller 40 may assign code 'v8s-5b0' to the driving state with speed '8', slope '−5' and brake hydraulic pressure '0' as factors as categorized data. The controller 40 may assign code 'v13s-5b0' to the driving state with speed '13', slope '-5' and brake hydraulic pressure 'O' as factors. The controller 40 may assign code 'v13s-4b0' to the driving state with speed '13', slope '−4' and brake hydraulic pressure '0' as factors. The controller 40 may assign code 'v13s-4b5' to the driving state with speed '13', gradient '−4' and brake hydraulic pressure '5' as factors.

The controller 40 may assign code number '1819' to code 'v8s-5b0' as an example, and assign code number '1802' to code 'v13s-5b0' as an example. The controller 40 may assign code number '1816' to code 'v13s-400' as an example, and assign code number '1802' to code 'v13s-4b5' as an example. As another example, the controller 40 may assign code number 'O' when the speed is 'O', the gradient is '−10', and the brake hydraulic pressure is '0', and assign code number '1' when the speed is '0', the gradient is '−10', and the brake hydraulic pressure is '1'. When the driving state of the vehicle is defined in such a manner, the number of code numbers may be about 8500.

The controller 40 may use the code number of the current time point (t) as the row index and the code number of the next time point (t+1) as the column index, thereby generating transition number matrix 340 that has the number of transitions from the code number of a current time point to the code number of a next time as a value. In this case, the controller 40 applies the above-described scheme of processing the driving data 310 to the driving data 320 collected from the second vehicle and the driving data 330 collected from the third vehicle to the driving data 330 collected from the third vehicle as it is, and reflects the result in the transition number matrix 340. Through such a process, the number of times of the transition number matrix 340 may be increased. In this case, although three driving data have been described as an example, the number of driving data may be arbitrarily changed according to a designer's intention.

The controller 40 may normalize the transition number matrix 340 to generate a transition probability matrix 350 as shown in FIG. 3. In the transition probability matrix 350, the sum of each column becomes '1'.

The controller 40 may generate a plurality of driving patterns based on the transition probability matrix 350. The driving pattern thus generated is shown in Table 1 below as an example.

TABLE 1

| Time | Code Number |
| --- | --- |
| 0 | 120 |
| 1 | 2432 |
| 2 | 1203 |
| ... | ... |

Table 1 shows a driving pattern in which code numbers indicating the driving states of a vehicle sequentially transition from 120 to 2432 and then to 1203. By repeatedly performing the process of selecting an initial driving state and determining the next driving state based on probability using the transition probability matrix 350, various driving patterns may be generated for a specified period of time (e.g., 5 minutes). Although the driving pattern is generated based on probability, the driving pattern includes the driving characteristics of a real road because real road data collected from a plurality of vehicles is used.

Hereinafter, a process in which the controller 40 verifies the driving pattern will be described with reference to FIGS. 4A to 7B.

Figure 4A:
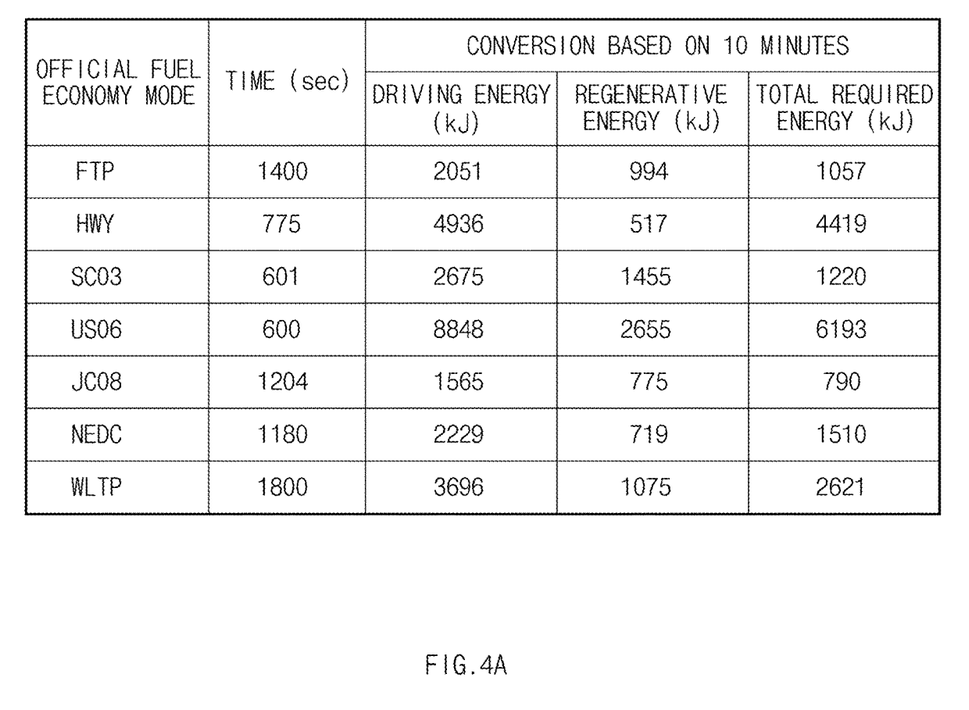
FIG. 4A is a view illustrating an example of reference data used to verify a driving pattern by a controller provided in a device for controlling a hybrid vehicle according to an exemplary embodiment of the present disclosure.

FIG. 4A is a view illustrating an example of reference data used to verify a driving pattern by a controller provided in a device for controlling a hybrid vehicle according to an exemplary embodiment of the present disclosure.

In FIG. 4A, the official fuel economy mode is a test mode made by simulating the driving patterns of vehicles in various countries, and because the driving patterns that may occur on a real road are simulated while the time and driving loads are different, the official fuel economy mode may be used to verify the validity of the driving pattern generated according to an embodiment of the present disclosure. In addition, the total energy required in each official fuel economy mode was standardized as 10 minutes. In this case, it may be understood that the total energy consumed for 10 minutes in each official fuel economy mode has a range of 790 kj to 6193 kj.

Figure 4B:
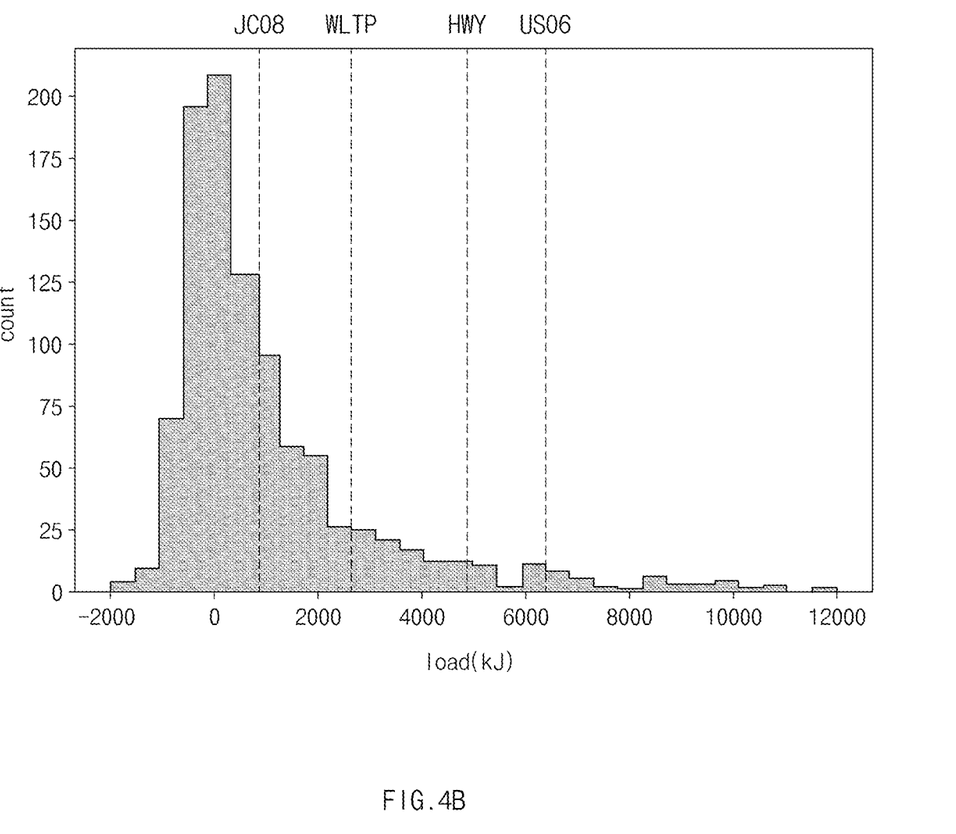
FIG. 4B is a view illustrating an example of a result of verifying a driving pattern by a controller provided in a device for controlling a hybrid vehicle according to an exemplary embodiment of the present disclosure.

FIG. 4B is a view illustrating an example of a result of verifying a driving pattern by a controller provided in a device for controlling a hybrid vehicle according to an exemplary embodiment of the present disclosure.

In FIG. 4B, the horizontal axis represents the total required energy and the vertical axis represents the count. Because the range of the total energy required in the official fuel economy mode is included in the total energy required distribution map of the driving patterns generated by the controller 40, it may be determined that the driving pattern generated by the controller 40 has high reliability.

Figure 5A:
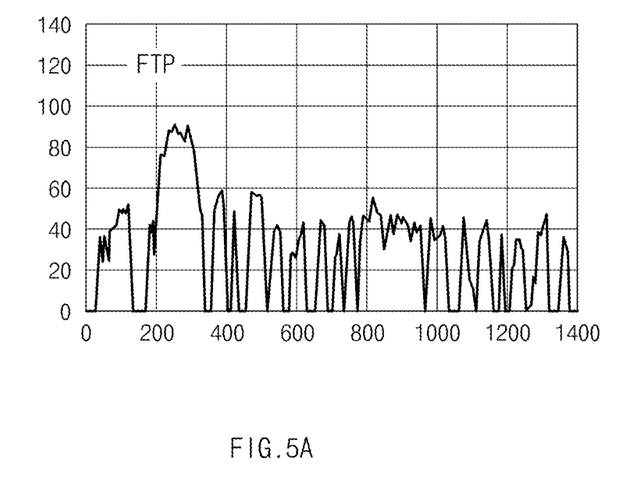
FIG. 5A is a characteristic graph of FTP used to verify a driving pattern by a controller provided in a device for controlling a hybrid vehicle according to an exemplary embodiment of the present disclosure.
Figure 5B:
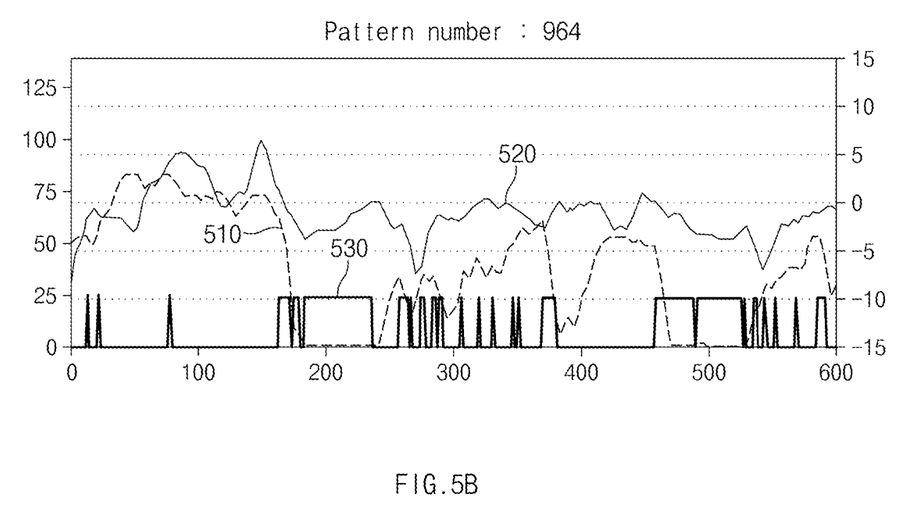
FIG. 5B is a view illustrating a first example of a detailed driving pattern generated by a controller provided in a device for controlling a hybrid vehicle according to an exemplary embodiment of the present disclosure.
Figure 6A:
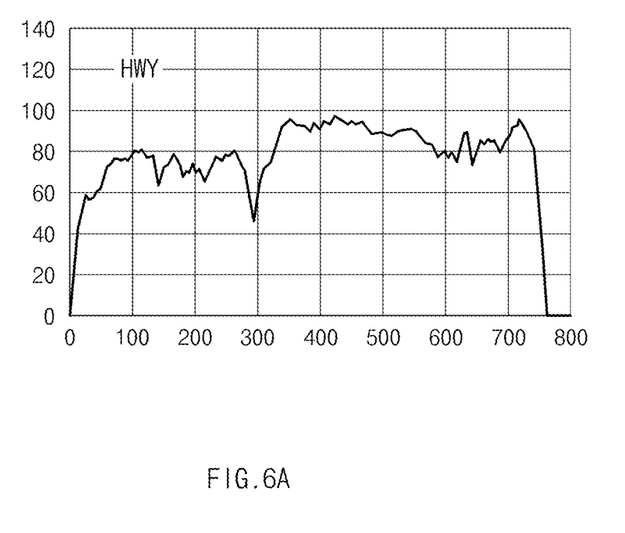
FIG. 6A is a characteristic graph of HWY used to verify a driving pattern by a controller provided in a device for controlling a hybrid vehicle according to an exemplary embodiment of the present disclosure.
Figure 6B:
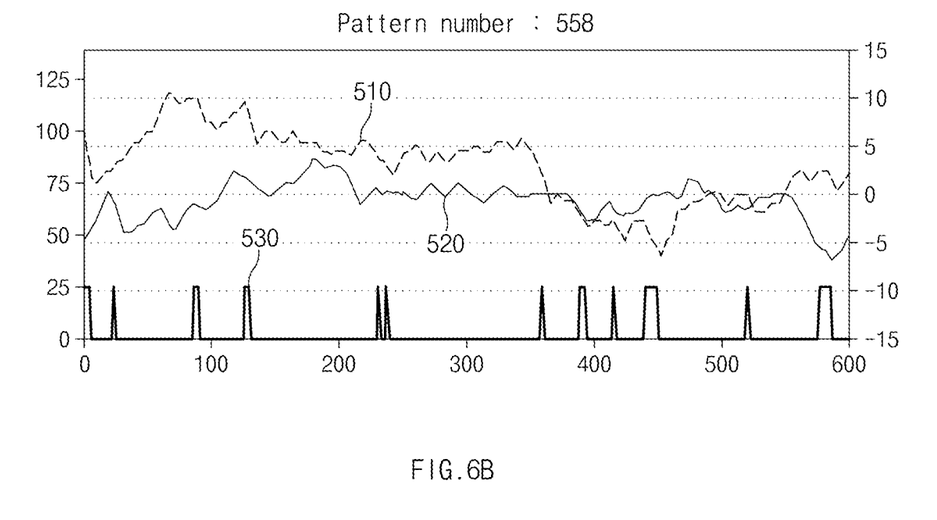
FIG. 6B is a view illustrating a second example of a detailed driving pattern generated by a controller provided in a device for controlling a hybrid vehicle according to an exemplary embodiment of the present disclosure.
Figure 7A:
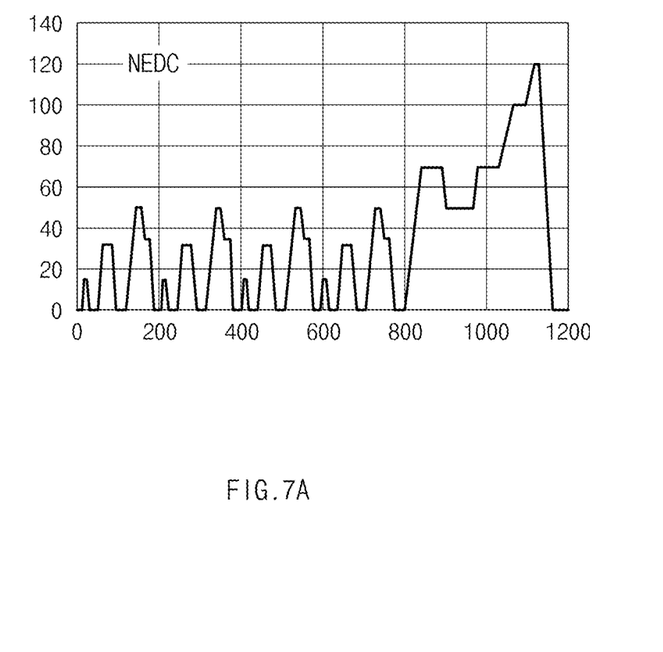
FIG. 7A is a characteristic graph of NEDC used to verify a driving pattern by a controller provided in a device for controlling a hybrid vehicle according to an exemplary embodiment of the present disclosure.
Figure 7B:
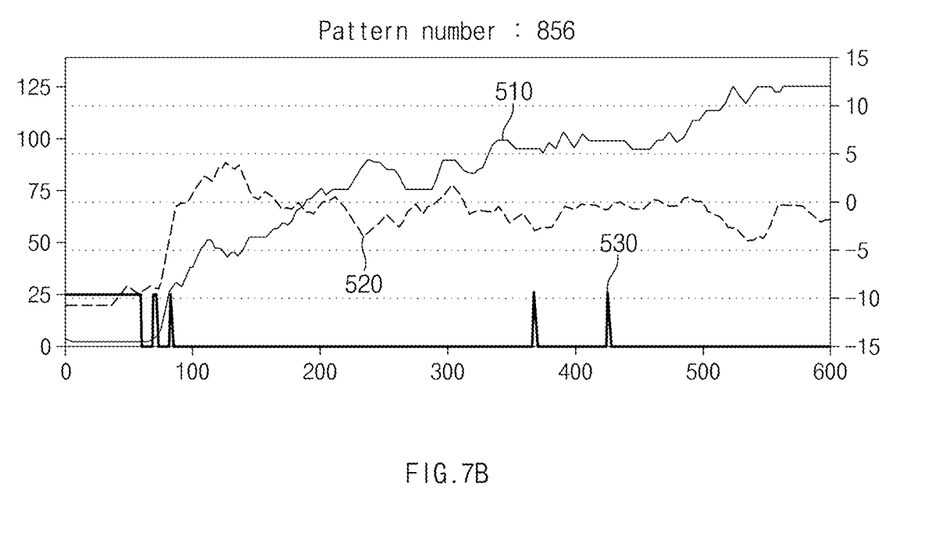
FIG. 7B is a view illustrating a third example of a detailed driving pattern generated by a controller included in a device for controlling a hybrid vehicle according to an exemplary embodiment of the present disclosure.

FIG. 5A is a characteristic graph of FTP used to verify a driving pattern by a controller provided in a device for controlling a hybrid vehicle according to an exemplary embodiment of the present disclosure. FIG. 5B is a view illustrating a first example of a detailed driving pattern generated by a controller provided in a device for controlling a hybrid vehicle according to an exemplary embodiment of the present disclosure. FIG. 6A is a characteristic graph of HWY used to verify a driving pattern by a controller provided in a device for controlling a hybrid vehicle according to an exemplary embodiment of the present disclosure. FIG. 6B is a view illustrating a second example of a detailed driving pattern generated by a controller provided in a device for controlling a hybrid vehicle according to an exemplary embodiment of the present disclosure. FIG. 7A is a characteristic graph of NEDC used to verify a driving pattern by a controller provided in a device for controlling a hybrid vehicle according to an exemplary embodiment of the present disclosure. FIG. 7B is a view illustrating a third example of a detailed driving pattern generated by a controller included in a device for controlling a hybrid vehicle according to an exemplary embodiment of the present disclosure.

In FIGS. 5B, 6B and 7B, reference numeral 510 represents a speed among driving data, reference numeral 520 represents a slope, and reference numeral 530 represents a brake hydraulic pressure.

It may be understood that the characteristic graph of FTP as shown in FIG. 5A in the official fuel economy mode shows a similar trend to the graph of a driving pattern 964 as shown in FIG. 5B. It may be understood that the characteristic graph of HWY as shown in FIG. 6A in the official fuel economy mode shows a similar trend to the graph of a driving pattern 558 as shown in FIG. 6B. In addition, it may be understood that the characteristic graph of FTP as shown in FIG. 7A in the official fuel economy mode shows a similar trend to the graph of a driving pattern 856 as shown in FIG. 7B.

Accordingly, the controller 40 may determine that the driving patterns 964, 558 and 856 have high reliability.

Meanwhile, the controller 40 may set the ratio of engine output to motor output corresponding to each driving pattern through a simulation tool. In this case, the simulation tool may be a generally well-known technique, and any simulation scheme may be used.

In addition, the controller 40 may include a table in which the ratio (co-state) of engine output to motor output corresponding to each driving pattern is recorded. As an example, the table is shown in following Table 2.

TABLE 2

| Pattern | co-state |
|---------|----------|
| 0 | 2.0 |
| 1 | 2.1 |
| 2 | 2.2 |
| ... | ... |

Figure 8:
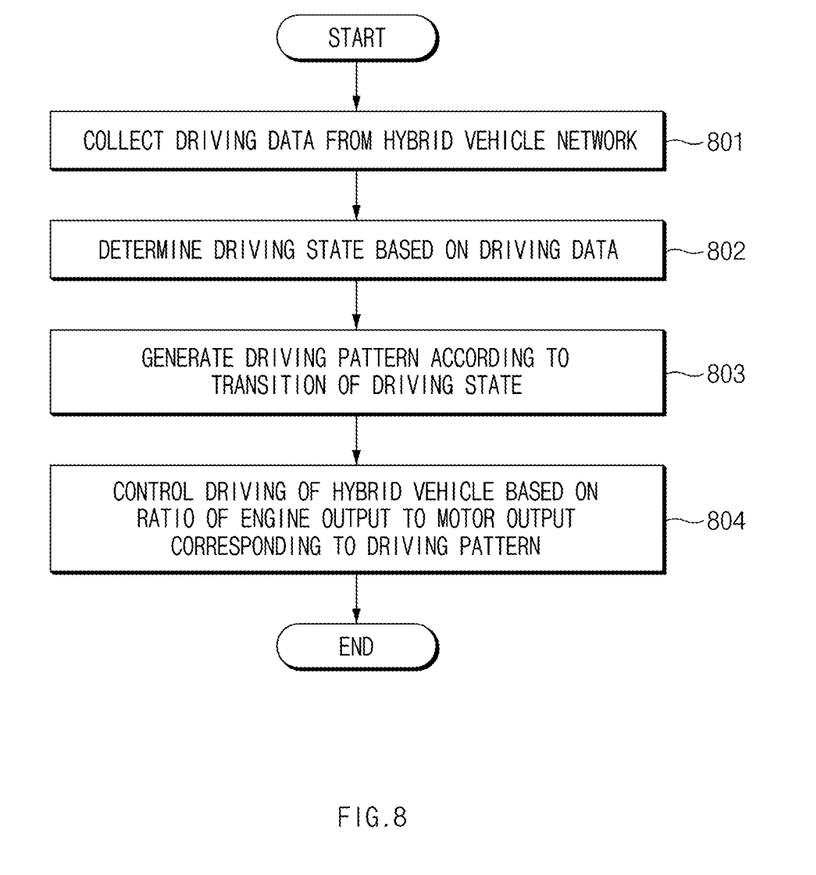
FIG. 8 is a flowchart of a method for controlling a hybrid vehicle according to an exemplary embodiment of the present disclosure.

FIG. 8 is a flowchart of a method for controlling a hybrid vehicle according to an exemplary embodiment of the present disclosure.

First, in 801, the controller 40 collects driving data from a hybrid vehicle network.

Then, in 802, the controller 40 determines the driving state based on the driving data.

Then, in 803, the controller 40 generates a driving pattern corresponding to the transition of the driving state.

Then, in 804, the controller 40 controls the driving of the hybrid vehicle based on the ratio of engine output to motor output corresponding to the driving pattern. In this case, the storage 10 stores a table in which the ratio of engine output to motor output corresponding to each driving pattern is recorded.

Figure 9:
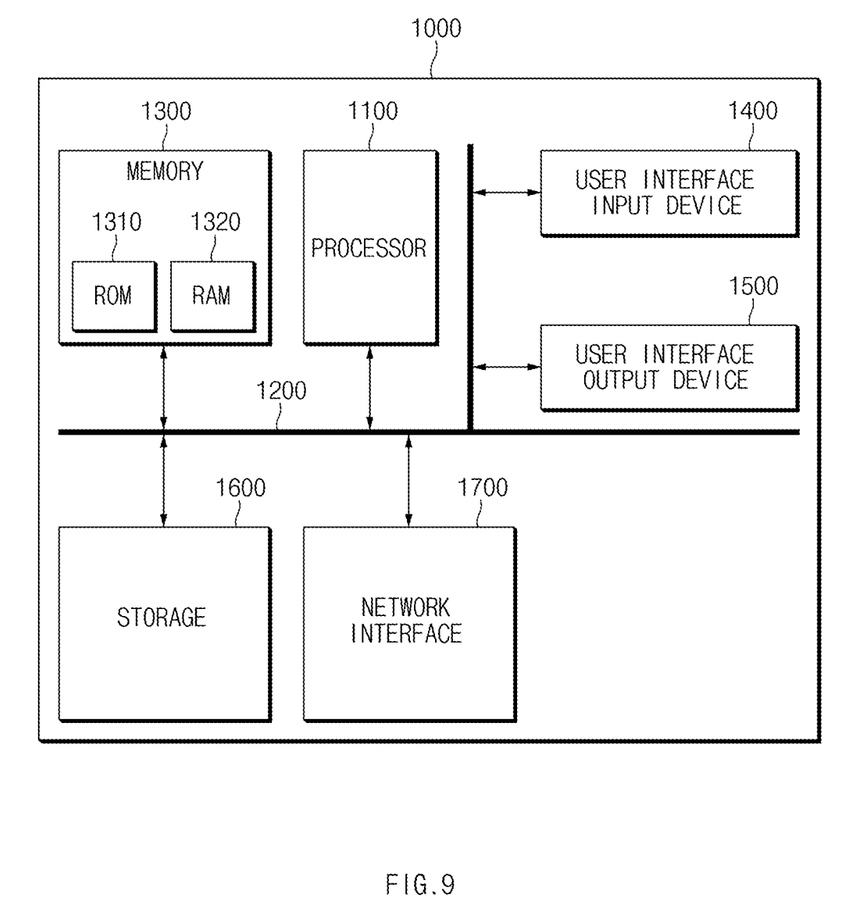
FIG. 9 is a block diagram illustrating a computing system for executing a method of controlling a hybrid vehicle according to an exemplary embodiment of the present disclosure.

FIG. 9 is a block diagram illustrating a computing system for executing a method of controlling a hybrid vehicle according to an exemplary embodiment of the present disclosure.

Referring to FIG. 9, a method of controlling a hybrid vehicle according to an embodiment of the present disclosure described above may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the device and method for controlling a hybrid vehicle can minimize electric energy consumption of a battery and fuel consumption in a rapidly changing driving environment by collecting driving data from a plurality of vehicles, determining a driving state based on the driving data, generating a driving pattern according to the transition probability of the driving state, and controlling the driving of the hybrid vehicle based on the output ratio of each power source (e.g., engine output and motor output) corresponding to the driving pattern.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A device for controlling a hybrid vehicle, the device comprising:

a connection device configured to provide a connection interface with a hybrid vehicle network; and a controller configured to collect driving data through the connection device, determine a driving state based on the driving data, generate a driving pattern according to a transition of the driving state, and control driving of the hybrid vehicle based on an output ratio of a first power source to a second power source corresponding to the driving pattern, wherein the controller is further configured to collect speeds, gradients of a road and brake hydraulic pressures from a plurality of vehicles, and wherein the controller is further configured to detect a representative speed of a speed section including the collected speeds, detect a representative gradient of a gradient section including the collected gradients, detect a representative hydraulic pressure of a hydraulic pressure section including the collected brake hydraulic pressures, assign different code numbers for each combination of the representative speed, the representative gradient and the representative hydraulic pressure, generate a transition number matrix indicating a number of times for which a first code number at a current time point (t) transitions to a second code number at a next time point (t+1), generate a transition probability matrix by normalizing the transition number matrix, and generate the plurality of driving patterns based on the transition probability matrix.

2. The device of claim 1, further comprising:

a storage configured to store a table in which ratios of output of the first power source to output of the second power source for a plurality of driving patterns are recorded, wherein the output of the first power source includes engine output and the output of the second power source includes motor output.

3. The device of claim 2, wherein the controller is further configured to search the table for a ratio of engine output to motor output corresponding to the generated driving pattern, among the ratios of engine output to motor output for the plurality of driving patterns.

4. The device of claim 2, wherein the controller is further configured to collect the driving data from the plurality of vehicles traveling on the road, determine the driving state based on the driving data, generate the plurality of driving patterns according to a transition probability of the driving state, and determine the ratios of engine output to motor output corresponding to the plurality of driving patterns.

5. The control device of claim 2, wherein the controller is further configured to determine the driving state based on the collected speeds, gradients and brake hydraulic pressures, generate a transition probability matrix of the driving state, and generate the plurality of driving patterns based on the transition probability matrix.

6. The control device of claim 4, wherein the controller is further configured to determine the ratios of engine output to motor output corresponding to the plurality of driving patterns through a simulation tool.

7. A method of controlling a hybrid vehicle, the method comprising:

collecting, by a controller, driving data from a hybrid vehicle network;

determining, by the controller, a driving state based on the driving data;

generating, by the controller, a driving pattern according to a transition of the driving state; and controlling, by the controller, driving of the hybrid vehicle based on an output ratio of a first power source to a second power source corresponding to the driving pattern, wherein the collecting of the driving data includes:

collecting speeds, gradients of the road and brake hydraulic pressures from a plurality of vehicles, and wherein the generating of the plurality of driving patterns includes:

detecting a representative speed of a speed section including the collected speeds;

detecting a representative gradient of a gradient section including the collected gradients;

detecting a representative hydraulic pressure of a hydraulic pressure section including the collected brake hydraulic pressures;

assigning different code numbers for each combination of the representative speed, the representative gradient and the representative hydraulic pressure;

generating a transition number matrix indicating a number of times for which a first code number at a current time point (t) transitions to a second code number at a next time point (t+1);

generating a transition probability matrix by normalizing the transition number matrix; and generating the plurality of driving patterns based on the transition probability matrix.

8. The method of claim 7, further comprising:

storing, by a storage, a table in which ratios of output of the first power source to output of the second power source for a plurality of driving patterns are recorded, wherein the output of the first power source includes engine output and the output of the second power source includes motor output.

9. The method of claim 8, wherein the controlling of the driving includes:

searching the table for a ratio of engine output to motor output corresponding to the generated driving pattern, among the ratios of engine output to motor output for the plurality of driving patterns.

10. The method of claim 8, wherein the storing of the table includes:

collecting, by the controller, the driving data from the plurality of vehicles traveling on the road;

determining, by the controller, the driving state based on the driving data to generate the plurality of driving patterns according to a transition probability of the driving state; and determining the ratios of engine output and motor output corresponding to the plurality of driving patterns.

11. The method of claim 8, wherein the generating of the plurality of driving patterns includes:

determining the driving state based on the collected speeds, gradients and brake hydraulic pressures;

generating a transition probability matrix of the driving state; and generating the plurality of driving patterns based on the transition probability matrix.

12. The method of claim 10, wherein the determining of the ratio of engine output to motor output includes:

determining the ratios of engine output to motor output corresponding to the plurality of driving patterns through a simulation tool.

* * * * *